United States Patent [19]
Brown

[11] Patent Number: 5,462,330
[45] Date of Patent: Oct. 31, 1995

[54] FOLDING CAMPING/CARGO TRAILER

[76] Inventor: Quentin M. Brown, 20 ½ College St., Clinton, N.Y. 13323

[21] Appl. No.: 109,947

[22] Filed: Aug. 23, 1993

[51] Int. Cl.[6] .................................................. B60P 3/34
[52] U.S. Cl. ...................... 296/172; 296/169; 296/173; 296/174; 135/88.01; 135/88.13; 135/126
[58] Field of Search .................................. 296/168, 169, 296/172, 173, 174, 176; 135/88.01, 88.13, 124, 125, 126, 128, 132, 138, 143

[56] References Cited

U.S. PATENT DOCUMENTS

| | | | |
|---|---|---|---|
| 1,247,282 | 11/1917 | Kline | 296/172 |
| 1,285,794 | 11/1918 | Reid | 296/169 |
| 1,564,257 | 12/1925 | Lippman | 296/169 |
| 1,595,541 | 8/1926 | Borah | 296/174 |
| 2,152,713 | 4/1939 | Stewart | 296/169 |
| 2,475,928 | 7/1949 | Walls | 296/173 |
| 2,481,230 | 9/1949 | MacDonald, Jr. | 296/173 |
| 2,632,667 | 3/1953 | Gray | 296/172 |
| 2,658,212 | 11/1953 | Green | 296/169 X |
| 3,001,813 | 9/1961 | Johnson | 296/173 |
| 3,032,369 | 5/1962 | Fischer | 296/169 |
| 3,149,876 | 9/1964 | Melbye | 296/173 |
| 3,194,251 | 7/1965 | Pettersen | 296/173 X |
| 3,315,421 | 4/1967 | Roy | 296/169 X |
| 3,325,206 | 6/1967 | Carlson | 296/173 |
| 3,333,884 | 8/1967 | Melbye | 296/173 |
| 3,371,954 | 3/1968 | Larsson | 296/169 |
| 3,608,953 | 9/1971 | Bernard | 296/23 |
| 3,652,122 | 3/1972 | Beauregard | 296/169 |
| 3,724,893 | 4/1973 | Giroux | 296/173 |
| 3,917,337 | 11/1975 | Couix | 296/23 |
| 4,057,285 | 11/1977 | Bemos | 296/23 |
| 4,754,998 | 7/1988 | LeJuerrne | 296/173 |
| 4,918,772 | 4/1990 | Haile | 5/119 |
| 5,080,426 | 1/1992 | Johnson | 296/168 X |

FOREIGN PATENT DOCUMENTS

1279963  11/1961  France ................................... 296/172

Primary Examiner—Joseph D. Pape
Attorney, Agent, or Firm—Charles S. McGuire

[57] ABSTRACT

A camper/cargo trailer having an upper tent structure mounted upon a wheel mounted trailer box where the upper tent structure is movable between erected and folded positions with respect to the trailer box. The movable framework has a maximum height and width approximately three times and one and a half times the maximum height and width of the trailer box when in the erected position, respectively. When in the closed position, the movable framework has a maximum height about twice the height of the trailer box, and a maximum width approximately equal to the maximum width of the trailer box.

19 Claims, 5 Drawing Sheets

FOLDING CAMPING/CARGO TRAILER

BACKGROUND OF THE INVENTION

This invention relates to folding tent trailers and, more particularly, to a folding tent trailer especially suited for storing and transporting large recreational cargo such as mountain bikes, jet skis, snowmobiles and the like, and which also provides ample sleeping and eating quarters when the canopy portion thereof is moved to the open position.

There exists many different types of folding tent structures incorporated into recreational campers such as those pulled behind a vehicle; mounted to a vehicle; and integral with the vehicle itself (e.g., "RVs"). A sampling of such folding tent structures may be seen in the following U.S. Pat. Nos.:

3,917,337 issued to Couix on Nov. 4, 1975;

4,918,772 issued to Haile on Apr. 24, 1990;

4,057,285 issued to Bemos on Nov. 8, 1977; and 3,608,953 issued to Bernard on Sep. 28, 1971.

The Couix patent discloses a folding tent trailer in which the folding tent structure is articulated upon the trailer box which itself is mounted to the trailer chassis. The folding tent structure opens and closes longitudinally of the box and, when in the closed position, forms a top which is even with the height of the box.

The Bernard patent discloses a collapsible camping trailer which includes a plurality of rectangular formed pole members hingedly connected to the perimeter of the box. The pole members are arranged about the box such that the trailer top opens both longitudinally and laterally of the box to provide maximum living space therein. As with the Couix trailer, the top ceiling of the Bernard tent structure is attached to the upper perimeter opening of the trailer body when folded to the closed position.

The Haile and Bemos patents both disclose folding beds incorporated in a side wall of a vehicle such as a camper wherein the bed may be moved between a stored position wherein the bed lies closely adjacent and parallel to the side wall, and an extended position wherein the bed extends laterally and perpendicularly from the side wall.

While the campers described in the above patents seem adequate for their intended purposes, little or no attention was given to accommodating large cargo such as recreational vehicles which are frequently taken along on camping trips (e.g., snowmobiles, jetskis, 3 and 4 wheelers, motorcycles, mountain bikes, etc.).

SUMMARY OF THE INVENTION

It is therefore a principal object of the present invention to provide a folding tent trailer which can easily accommodate large cargo items when in both the folded and unfolded positions.

It is a further object of the present invention to provide a folding tent trailer of the above type which provides sleeping areas for at least two people when in the unfolded position.

It is another object of the present invention to provide a folding tent trailer of the above type in which it is relatively easy to load and unload cargo therefrom.

It is still another object of the present invention to provide a folding tent trailer of the above type which is extremely quick and easy to move to and from the folded and unfolded positions.

Other objects will in part be obvious and in part appear hereinafter.

In accordance with the foregoing objects, the invention comprises a folding tent trailer of the type having a trailer box mounted to a chassis for hitching to and pulling behind a vehicle. The folding tent portion thereof is articulated upon the box and may be moved between a folded, transporting mode and an unfolded, camping mode. The folding tent structure comprises a hinged framework of rigid tubing having both linear and curved segments which are interconnected to be easily and smoothly moved between the folded and unfolded positions about their hinged connections. A flexible covering is attached in conforming relationship to the framework and is movable therewith to provide a tent-like enclosure.

More particularly, the framework is fixedly attached to a pair of elongated, planar boards which themselves are each hingedly connected along one of their longest side edges to a respective one of the opposite, top side edges of the trailer box. The hinges connecting the planar boards to the trailer box permit the planar boards to be moved between a horizontal position extending laterally of the trailer box when the tent structure is in the unfolded position, to a generally vertical position extending upwardly from the trailer box when the tent structure is in the folded position. When in the horizontal position, the planar boards provide a sleeping surface and when in the generally vertical position, the planar boards form an upper extension of the trailer box side walls.

The folding tent framework is longitudinally symmetrical and includes a pair of outwardly bowed arches at the forward and rear ends of the trailer box, respectively, with the top of the arches positioned at the longitudinal center line of the trailer and the sides of each arch equally spaced on opposite sides of the longitudinal center line. The bottom ends of each of the arches are each pivotally connected to first ends of respective curved members of the side portions of the framework which have the same curvature as each leg of the arch. The second ends of the curved members of the side framework are attached above the outer edge of a respective planar board by a linear side frame member. The curved members of the arches may be pivoted about their bottom ends to a position of minimum height with respect to the trailer floor with each leg of the arch lying closely adjacent a respective curved side member when in the closed position, to a position of maximum height with respect to the trailer floor with the legs of the arch lying substantially perpendicular to the respective curved side members.

The arches are thus moved from a maximum to minimum height with respect to the trailer box floor when the framework is moved from the open to closed positions, respectively. When in the open position, this maximum height is approximately 3 times the height of the trailer box and when in the closed position, the maximum height is approximately twice the height of the trailer box. Also, when in the open position, the maximum width of the upper tent structure is approximately 1½ times the width of the trailer box and when in the closed position, the maximum width thereof is substantially equal to the width of the trailer box. Furthermore, the outward curvature of the arches and curved members of each side framework are orientated about the longitudinal center line of the trailer box when in both the closed and open positions thereby maintaining an entry and exit port of substantial height and width at the rear end of the trailer box for the easy loading and unloading of the cargo items.

DETAILED DESCRIPTION

Figure 2:
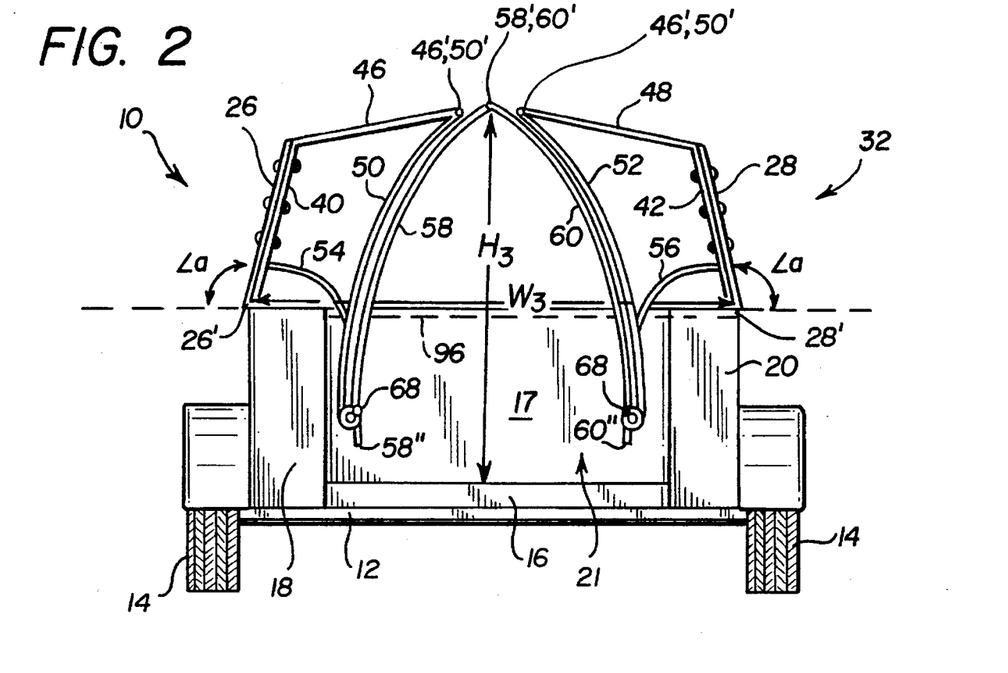
FIG. 2 is a rear, elevational view of FIG. 1.
Figure 3:
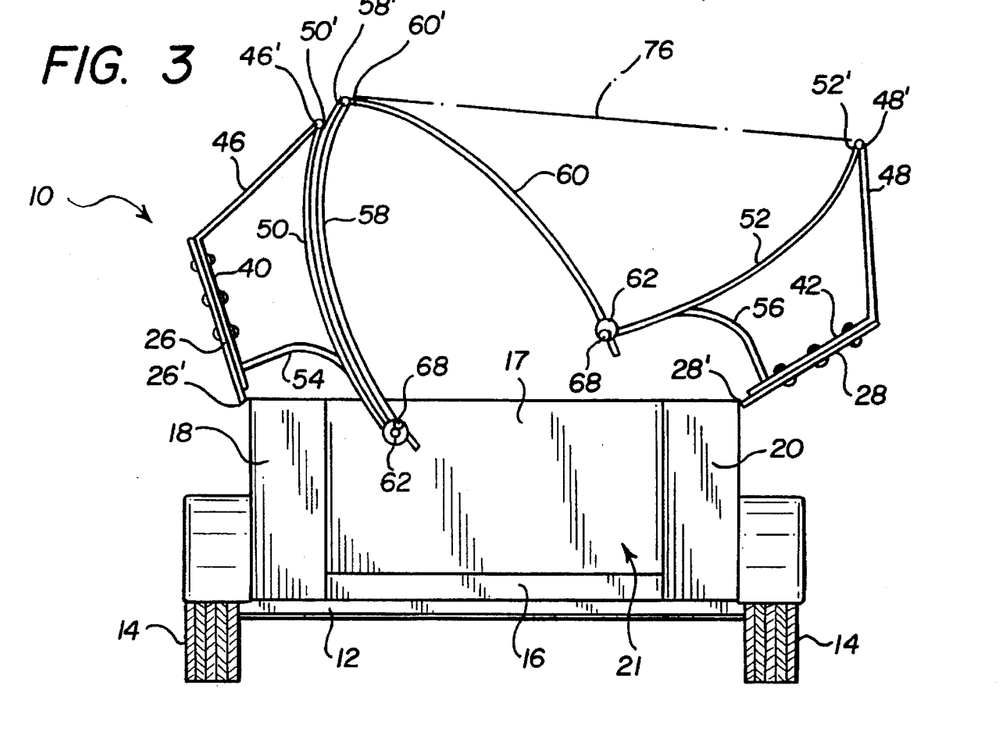
FIG. 3 is the view of FIG. 2 showing the folding tent structure in the partially open position.
Figure 4:
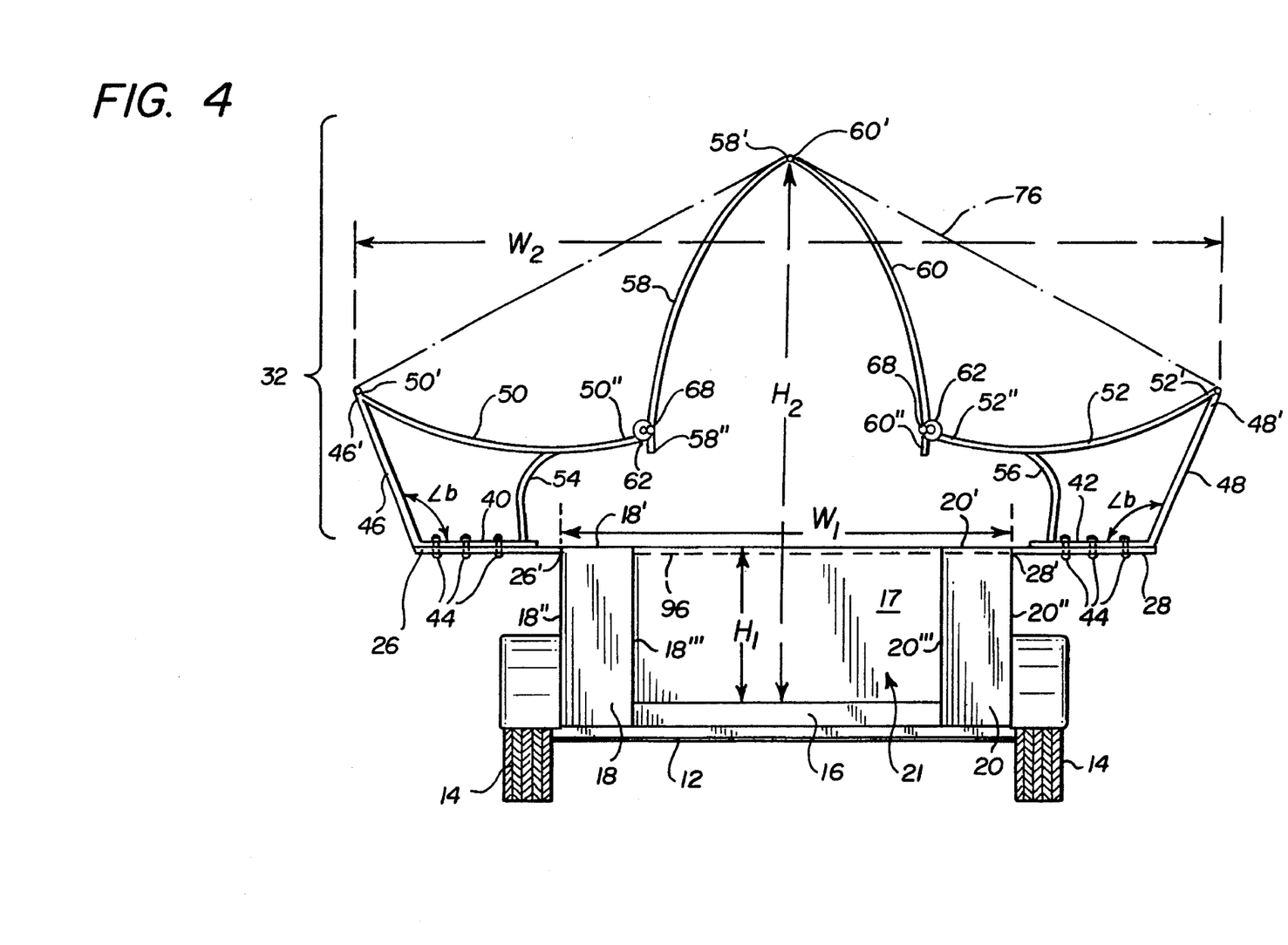
FIG. 4 is the view of FIGS. 2 and 3 showing the folding tent structure in the fully open position.

Referring now to the drawings, there is seen in FIGS. 1–5 the inventive folding camping/cargo trailer denoted generally by the reference numeral 10. Trailer 10 is of the type including a chassis 12 supported by a pair of wheels 14 to which is mounted a trailer box including a floor 16, front wall 17 (FIGS. 2 and 5), and rectangular side walls 18 and 20 and further having a maximum height $H_1$ and width $W_1$ as measured from floor 16 to the top surfaces 18' and 20' of side walls 18 and 20, and between the outer surfaces 18" and 20" thereof, respectively (FIG. 4). In this regard, it is noted that side walls 18 and 20 may themselves be constructed of varying width (thus varying the width of the internal space of the trailer box) and may be hollow to provide additional storage space with top surfaces 18' and 20' thereof being made movable to access the interior of walls 18 and 20. A rear opening 21 is provided between side walls 18 and 20 for entry and exit of personnel and cargo inside trailer 10. A door 23 (FIG. 1) may be removably attached between side walls 18 and 20 when traveling. A hitch 22 is provided at the front end 25 of trailer 10 (FIGS. 1 and 5) for pulling trailer 10 behind a vehicle (not shown) in the usual manner. Folding camping/cargo trailer 10 provides a utility trailer which can accommodate large cargo items such as snowmobiles, jetskis, mountain bikes, and the like, while also providing a camping trailer which can comfortably sleep at least two persons when the tent portion thereof is moved to the unfolded position. Trailer 10 is also extremely compact with the utmost attention given to utilizing space constraints in the most efficient manner.

Figure 5:
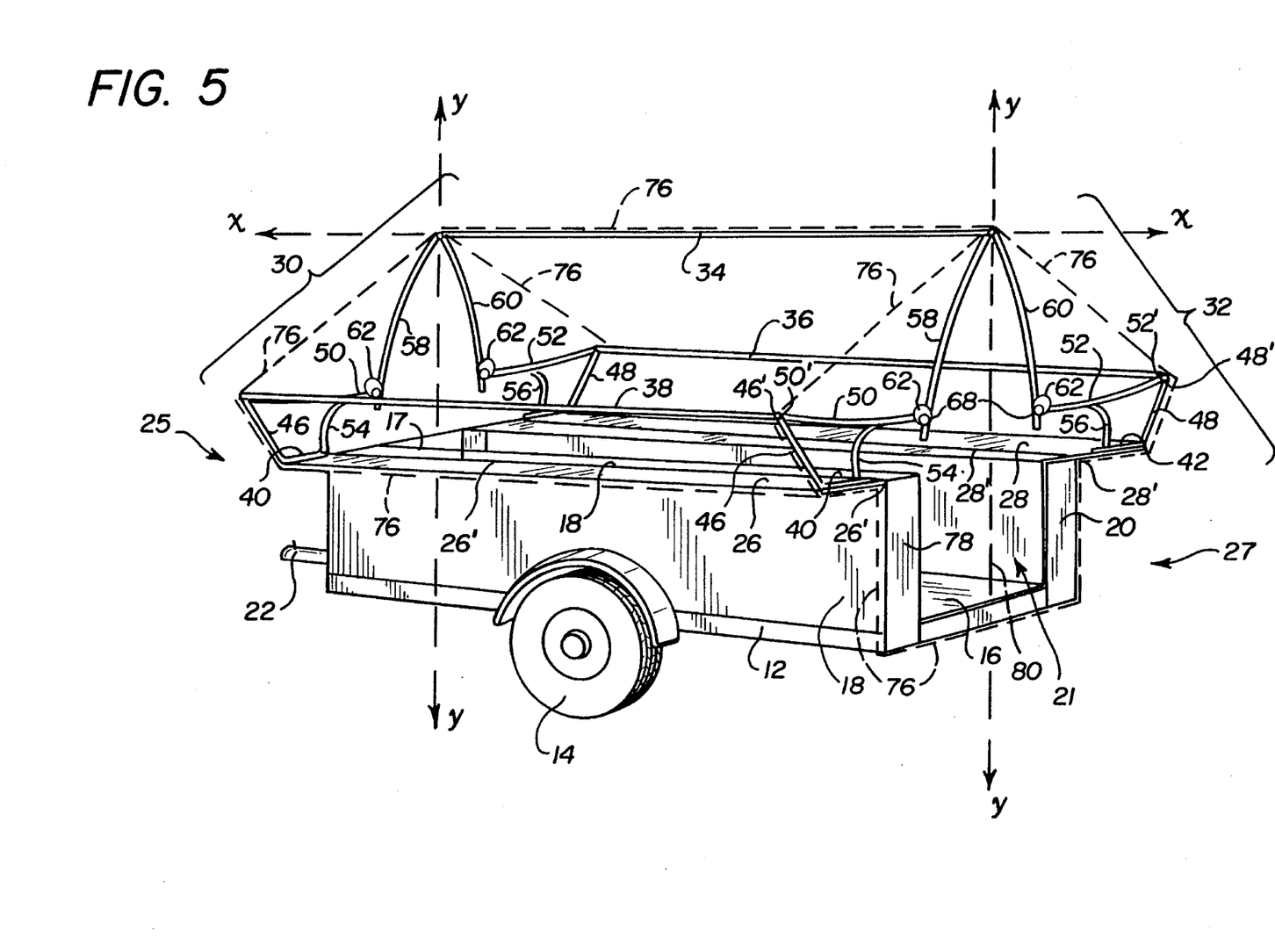
FIG. 5 is the view of FIG. 1 showing the folding tent structure in the fully open position.

Attention is turned to FIGS. 4 and 5 which show the folding tent structure of trailer 10 in the open, unfolded position. Particularly, the folding tent structure of trailer 10 includes a pair of elongated, rectangular, planar boards 26 and 28 which are hingedly attached along the inner edges 26' and 28' thereof to the upper-most edges of the outer surfaces 18" and 20" of side walls 18 and 20, respectively, of the trailer box. The hinge connections of edges 26' and 28' are such that boards 26 and 28 may be moved through an obtuse angle "a" (FIG. 2) between the fully horizontal position seen in FIGS. 4 and 5, to the upright position seen in FIGS. 1 and 2 where angle "a" is approximately 105 degrees. When in the fully horizontal position, boards 26 and 28 lie substantially coplanar with the top surfaces 18' and 20' of side walls 18 and 20, respectively, and together providing a sleeping surface whereupon one may place a mattress and/or sleeping bag.

The tent framework is mounted directly to boards 26 and 28 and is movable therewith. The framework comprises a plurality of interconnected, rigid frame members formed of a suitable material which is rigid yet lightweight (e.g., hollow aluminum tubing). The framework is symmetrical about a central longitudinal axis x—x and includes identical sub-frameworks 30 and 32, respectively, which are mounted at the front and rear ends 23 and 25, respectively, of the trailer box and are joined by a top, central, linear tubing member 34 and a pair of opposite side, linear tubing members 36 and 38, each of which extend parallel to each other and longitudinally across the full length of the trailer box.

More particularly, each sub-framework 30 and 32 are themselves symmetrical about a linear axis y—y which extends perpendicular to longitudinal axis x—x and include first and second, linear securing members 40 and 42 which are attached along the front and rear edges of boards 26 and 28, respectively, by a plurality of carriage bolts and acorn nuts 44 extending therethrough in longitudinally spaced relation along each securing member 40 and 42. Securing members 40 and 42 are somewhat shorter than boards 26 and 28 are wide, and the outer ends of members 40 and 42 are positioned substantially flush with the outer edges of boards 26 and 28 whereby the inner ends of members 40 and 42 are spaced slightly outwardly of hinge connections 26' and 28' respectively, as seen best in FIG. 4

First and second linear side members 46 and 48 are fixedly attached (e.g., by welding) at first ends thereof to the outer ends of securing members 40 and 42 at an obtuse angle "b" which is approximately 110 degrees. First and second curvilinear members 50 and 52 are fixedly attached-at the outer ends 50' and 52' thereof to the second, outer ends 46' and 48' of side members 46 and 48 located opposite securing members 40 and 42. Curvilinear members 50 and 52 are seen to bow in a direction toward boards 40 and 42, respectively, and reach from side members 46 and 48 to a point superior of the inner surfaces 18''' and 20''' of side walls 18 and 20, respectively, when the upper tent structure is in the open position seen in FIGS. 4 and 5. Third and fourth curvilinear members 54 and 56 are fixedly attached at opposite ends thereof to and between securing member 40 and first curvilinear member 50 on one side of sub-framework 32, and securing member 42 and second curvilinear member 52 on the other side of sub-framework 32, respectively.

The first ends of members 54 and 56 are attached adjacent the inner ends of securing members 40 and 42 while the second, opposite ends thereof are attached to members 50 and 52 approximately ⅓ from the inner ends 50" and 52" of members 50' and 52'. It will be noticed that third and fourth curvilinear members 54 and 56 bow in a direction toward side members 46 and 48, respectively, and provide a strong brace between first and second curvilinear members 50 and 52 and securing members 40 and 42, respectively.

Fifth and sixth curvilinear members 58 and 60 are fixedly attached to each other at first ends 58' and 60' thereof and bow outwardly in a direction away from each other to form a pointed, arch-like configuration. The second, opposite ends 58" and 60" of members 58 and 60 are pivotally mounted between a pair of washers which are fixedly attached to the inner ends 50" and 52" of members 50 and 52 located opposite side members 46 and 48, respectively.

Figure 6:
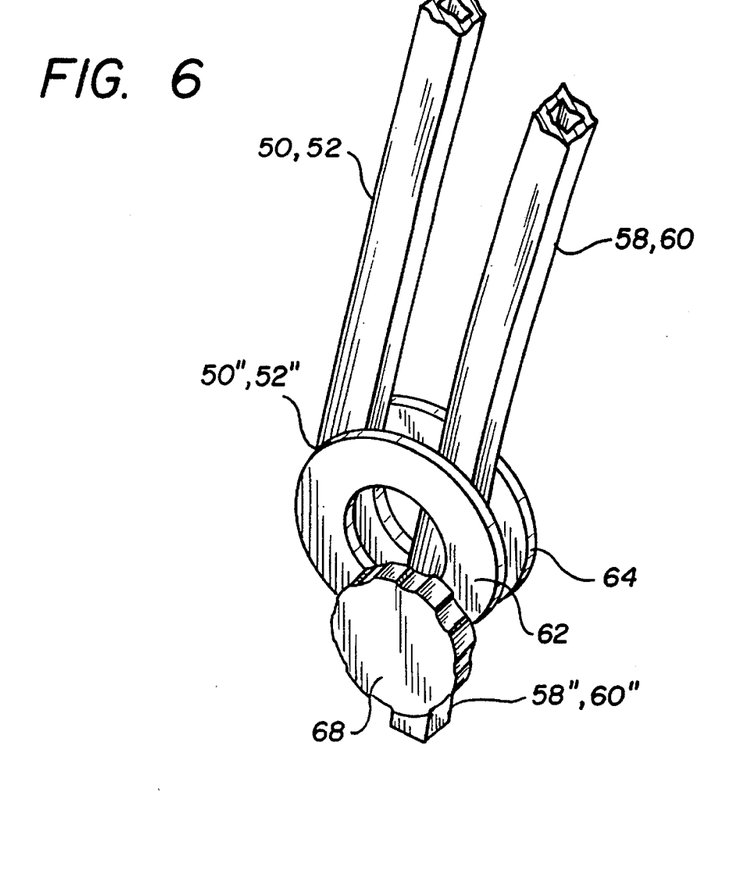
FIG. 6 is a fragmentary, perspective view of the pivotal connection between the ends of one of the curved members of the arch and curved member of the side portion of the framework.
Figure 7:
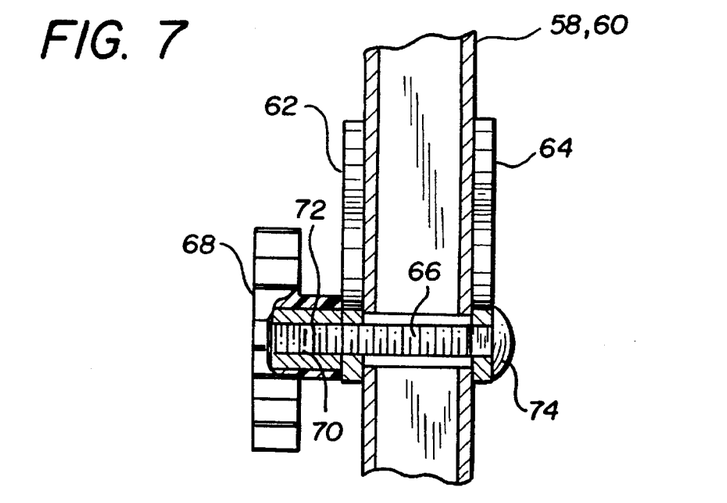
FIG. 7 is a longitudinal, cross-sectional view through the pivot connection of FIG. 6.

Attention is turned to FIGS. 6 and 7 which show the pivotal mounting of ends 58" and 60" with more clarity. Specifically, the inner ends 50''', 52''' of first and second curvilinear members 50, 52 are fixedly sandwiched between a pair of washers 62 and 64 which lie in spaced, parallel planes to each other. The lower ends 58" and 60" of fifth and sixth curvilinear members 58, 60 are pivotally sandwiched between washers 62 and 64 at a location opposite ends 50", 52", respectively, by a carriage bolt 66 which extends laterally through aligned apertures formed in washers 62 and 64 and members 58, 60. A knob 68 having an internally threaded shaft 70 is removably secured to the exposed end 72 of carriage bolt 66 opposite bolt head 74. After the upper tent structure is moved to the open position, knobs 68 are tightened to firmly secure the upper tent structure in the open position. When moving the upper tent structure to the closed position, knobs 68 are loosened to allow the free pivotal movement of ends 58" and 60" about washers 62 and 64, respectively.

As aforementioned, FIG. 4 shows the upper tent structure in the fully open position. In this position, boards 26 and 28 are horizontal and lie substantially co-planar with the top surfaces 18' and 20' of side walls 18 and 20. Further, the upper tent structure has a maximum width $W_2$ and height $H_2$ as measured between ends 46' and 48' of side members 46 and 48, and joined ends 58' and 60' of members 58 and 60 and the floor 16 of the trailer box, respectively where $H_2$ is about three times the maximum height $H_1$ of the trailer box, and where $W_2$ is at least 1½ times the maximum width $W_1$ of the trailer box. Also, the lower ends 58" and 60" of fifth and sixth curvilinear members 58 and 60 lie at points superior to the inner edges 18''' and 20''' of side walls 18 and 20, respectively. To move the upper tent structure to the closed position, the planar boards and side members 40, 46 and 42, 48 are lifted upwardly, either individually or simultaneously with one person on each side of the trailer. As the boards and side members are lifted, ends 58" and 60" of fifth and sixth curvilinear members 58 and 60 pivot about their respective carriage bolts 66 whereby the pairs of the outermost ends 50', 58' and 52', 60' of the first, fifth, second and sixth curvilinear members 50, 58, 52 and 60, are drawn toward each other, respectively.

Figure 1:
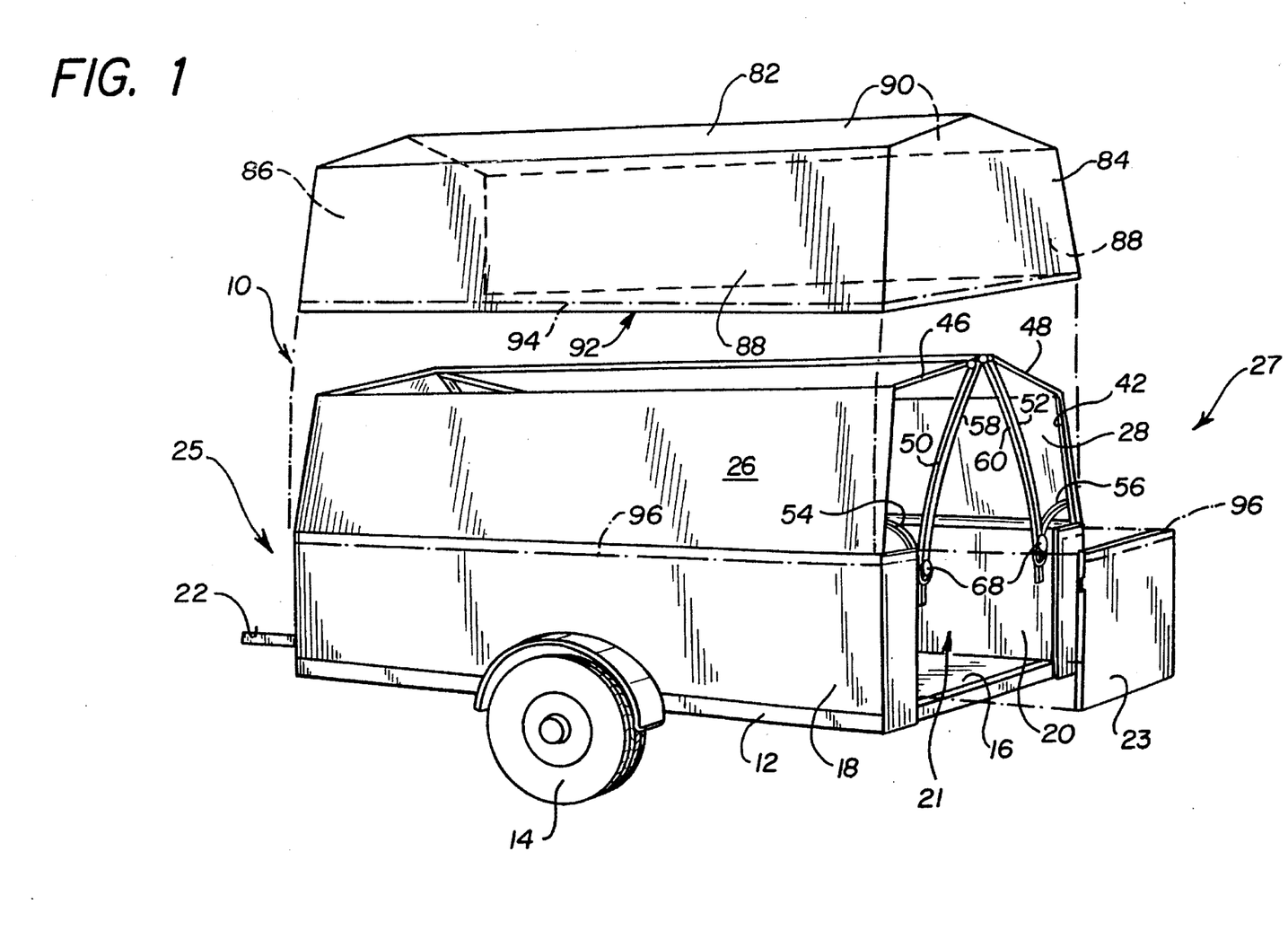
FIG. 1 is a perspective view of the inventive folding tent trailer with the folding tent structure shown in the folded, closed position.

As seen best in FIGS. 1–3, first and second curvilinear members 50 and 52 have the same line of curvature as fifth and sixth curvilinear members 58 and 60 with members 50 and 52 being slightly shorter than members 58 and 60. As such, paired members 50, 58 and 52, 60 are brought into closely adjacent, parallel relationship when the tent framework is moved to the fully closed position of FIGS. 1 and 2. In this position, the lower ends 50", 58" and 52", 60" of paired members 50, 58 and 52, 60, respectively, lie at points below the top surfaces 18' and 20' of side walls 18 and 20, yet are closely adjacent the inner surfaces 18''' and 20''' thereof.

It will be readily seen, therefore, that the closed configuration of the upper tent framework provides an internal area having maximum height and width dimensions $H_3$ and $W_3$, respectively, (FIG. 2) which is about twice the height $H_1$ and the same width $W_1$ of the trailer box, respectively, and which provides ample space for the storage of large cargo. With rear door 23 removed, an arched entry and exit port 21 is defined by the side wall inner surfaces 18' and 20' and floor 16 of the trailer box, and fifth and sixth curvilinear members 58 and 60 of the rear sub-framework 32, for the passage of personnel and cargo to and from the trailer box interior. This entry and exit port 21 is large enough to accommodate the average height and width dimensions of the type of cargo mentioned above (i.e., snowmobiles, ATVs, mountain bikes, jet skis, etc.). Opening the upper tent structure from the closed position is essentially the reverse of the above-described procedure to close the upper tent structure. That is, planar boards and side frames 40, 46 and 42, 48, respectively, are pulled downwardly either individually or simultaneously with a person on either side of the trailer. In this regard, handle means may be provided, if desired, on the outer surface of the planar board members (not shown) to facilitate manually grasping the board members when pulling down.

It is significant to note that the planar boards 40 and 42 are supported in the horizontal position by the framework of the upper tent structure and tent covering (described below) with no external "outriggers" needed as in many of the prior art campers.

As seen in dotted outline in FIGS. 3–5, a flexible outer tent covering 76 is provided which conforms to the outer perimeter of the upper tent structure such that it provides a complete enclosure for trailer 10. Specifically, covering 76 is removably attached to the trailer box via hook and pile fabric (not shown) attached to the inside perimeter of covering 76 and the corresponding locations on the trailer box which the perimeter of covering 76 is seen to cover. Covering 76 extends height-wise from floor 16 at rear end 27 upwardly to linear member 34, and width-wise from the outer surfaces 18' and 20' of side walls 18 and 20 at the trailer box level, and from the outer ends 46', 50' and 48', 52' at the upper framework level. The longitudinal, lengthwise perimeter edges of covering 76 attach to and traverse the outer edges of the planar board members 26 and 28 with covering 76 extending upwardly therefrom around longitudinal members 36 and 38 to top longitudinal member 34. A zipper 80 (FIG. 5) is provided to quickly open and close rear opening 21 as desired when in the camping mode with the upper tent structure fully deployed.

It is further noted that moving the upper tent structure to the fully open, erected position is made smooth and easy by virtue of the negative pressure inside the trailer created by the tent covering as the upper tent structure is opened. Thus, as planar boards 40 and 42 are pulled downwardly from the closed to open positions, they do so very smoothly (i.e., they do not come "crashing" down) due to the damping effect created by this negative pressure.

Due to the flexible nature of the material from which covering 76 is made (e.g., nylon, canvas, etc.), covering 76 may remain attached to trailer 10 when the upper tent structure is moved to the closed position. In this instance, the two portions of covering 76 extending between top longitudinal frame member 34 and side longitudinal frame members 36 and 38 will simply double over upon themselves and be sandwiched between paired curvilinear members 50, 58 and 52, 60. Zipper 80 is opened and the edges of covering 74 attached to the rear part of the trailer box are released therefrom and folded back into the trailer through opening 21. Rear door 23 may then be attached to side walls 18 and 20 by suitable means (not shown).

As seen in FIG. 1, a second covering 82 is provided which closely conforms to and completely covers the upper tent structure above side walls 18 and 20 and front wall 17 when in the closed position. Particularly, the shape of the covering 82 is formed by front and rear, pentagon-shaped panels 84 and 86 which are interconnected by longitudinally extending side and top panels 88 and 90, respectively, defining an open bottom 92. The perimeter of open bottom 92 includes means for releasably securing covering 82 to the upper tent structure in the preferable form of a pile VELCRO® strip 94 which releasably engages co-linear hook VELCRO® strips 96 attached along the uppermost edge of outer surfaces 18' and 20' of side walls 18 and 20, front wall 17 and rear door 23. Covering 82 is also formed of a flexible material (preferably a leather-like material) and acts to additionally secure the upper tent structure in the closed position and prevent accidental opening thereof when traveling on the highway, for example. (As previously mentioned, tightening of knobs 66 also accomplishes securement of the upper tent structure in either the open or closed positions). Covering 82 is of course removed and stored when it is desired to open the upper tent structure.

It may thus be realized that the present invention provides a trailer which is both a utility trailer and a camping trailer in that it accommodates large cargo and provides ample sleeping facilities. This is accomplished with a relatively compact trailer body and easily convertible upper tent structure. The opening and closing of the upper tent structure is extremely simple and may be performed by one person in under one minute. While the foregoing has described the invention with particular reference to a preferred embodiment thereof, it will be understood that various modifications may be made without departing from the full spirit and scope of the invention as is defined by the claims which follow. That is, although the folding frame has been shown and described as permanently connected to a box-type trailer, it could as easily be mounted upon a flatbed trailer, pick-up truck or similar vehicle, or even be a freestanding unit, so long as means are provided for maintaining one axis of rotation of each of the left and right portions fixed (e.g., the axis of the hinged support of inner edges 26', 28' of boards 26, 28) while accommodating the positions of the movable axes of rotation (at the pivotal connection of members 58 and 60 to the left and right side frameworks) when in the folded position.

What is claimed is:

1. A foldable support frame manually moveable between a relatively compact, folded position and a more spacious, erected position, said frame having a longitudinal axis extending between front and rear ends, and left and right sides, and comprising, in combination:
   a) a front frame assembly including:
      i) a central, front subassembly comprising a first pair of rigid, elongated members each extending between opposite ends, connected to one another at one end and spaced a predetermined distance from one another at the other end;
      ii) a right, front subassembly comprising a first plurality of rigid, elongated members fixedly connected to one another to form a first, polygonal outline;
      iii) a left, front subassembly comprising a second plurality of rigid, elongated members fixedly connected to one another to form a second, polygonal outline;
      iv) first means connecting said right front subassembly with one of said first pair of members for pivotal movement with respect to one another about a first, right axis, parallel to said longitudinal axis and spaced from said one end of said one member, with said rigid members of each of said central and right subassemblies remaining substantially in a first, common plane normal to said longitudinal axis; and
      v) second means connecting said left front subassembly with the other of said first pair of members for pivotal movement with respect to one another about a first, left axis, parallel to said longitudinal axis, and spaced from said one end of said other member, with said rigid members of said central and left subassemblies remaining substantially in said first, common plane;
   b) a rear frame assembly comprising:
      i) a central, rear subassembly comprising a second pair of rigid, elongated members each extending between opposite ends, connected to one another at one end and spaced said predetermined distance from one another at the other end;
      ii) a right, rear subassembly comprising a third plurality of rigid, elongated members fixedly connected to one another to form a third, polygonal outline;
      iii) a left, rear subassembly comprising a fourth plurality of rigid, elongated members fixedly connected to one another to form a fourth, polygonal outline;
      iv) third means connecting said right rear subassembly with one of said second pair of members for pivotal movement with respect to one another about said first right axis, with said rigid members of each of said central and right rear subassemblies remaining substantially in a second, common plane spaced from and parallel to said first plane; and
      v) fourth means connecting said left rear subassembly with the other of said second pair of members for pivotal movement with respect to one another about said first left axis, with said rigid members of each of said central and left rear subassemblies remaining substantially in said second plane;
   c) right, fixed support means;
   d) means for mounting each of said right front and said right rear subassemblies for pivotal movement with respect to said right, fixed support means about a common, second right axis, parallel to and spaced from said first right axis;
   e) left, fixed support means; and
   f) means for mounting each of said left front and said left rear subassemblies for pivotal movement with respect to said left, fixed support means about a common, second left axis, parallel to and spaced from said first left axis.

2. The foldable frame of claim 1 and further comprising wall means supported upon said front and rear assemblies for movement therewith between said folded and erected positions wherein said wall means define an enclosure of relatively smaller and larger volumes, respectively.

3. The foldable frame of claim 2 wherein said wall means is formed of a flexible, foldable material.

4. The foldable frame of claim 1 and further comprising at least one, rigid, longitudinally extending member parallel to said longitudinal axis and fixedly connected at opposite ends to said front and rear assemblies, respectively.

5. The foldable frame of claim 4 wherein said longitudinally extending member is fixedly connected at one end to said central front subassembly substantially at said one end of said first pair of members, and at the other end to said central rear subassembly substantially at said one end of said second pair of members.

6. The foldable frame of claim 1 and further including means fixedly connecting said right, front subassembly to said right, rear subassembly, and means fixedly connecting said left, front subassembly to said left, rear subassembly.

7. The foldable frame of claim 6 wherein said means connecting said right front and rear subassemblies includes a first, rigid, planar member, and said means connecting said left front and rear subassemblies includes a second, rigid, planar member.

8. The foldable frame of claim 7 wherein said first and second planar members lie in a common plane parallel to said longitudinal axis when said frame is in said erected position.

9. A foldable frame for supporting wall means defining an enclosure of relatively smaller and larger volumes when said frame is in folded and erected positions, respectively, said frame having a longitudinal centerline and comprising:

a) front and rear, central linkages each including a pair of elongated members extending from fixedly connected first ends to laterally spaced second ends;

b) a longitudinal member having opposite ends fixedly connected to said first ends of said front and rear, central linkages, respectively;

c) front and rear right side linkages pivotally connected to respective ones of said elongated members of said front and rear, central linkages for movement with respect thereto simultaneously about first and second, spaced axes, each parallel to and respectively movable and fixed with respect to said longitudinal centerline; and d) front and rear, left side linkages pivotally connected to the respective others of said elongated members of said front and rear, central linkages for movement with respect thereto simultaneously about third and fourth, spaced axes, each parallel to and respectively movable and fixed with respect to said longitudinal centerline.

10. The foldable frame of claim 9 wherein said front and rear right side linkages and said front and rear left side linkages are of essentially identical construction.

11. The foldable frame of claim 10 wherein each of said front and rear right and left side linkages comprise a plurality of elongated members fixedly attached to one another to form a polygonal outline.

12. The foldable frame of claim 11 wherein said polygonal outline is four sided.

13. The foldable frame of claim 9 wherein each of said front central, front right side and front left side linkages comprise a plurality of elongated members arranged substantially in a first, common plane, and said rear central, rear right side and rear left side linkages comprise a plurality of elongated members arranged substantially in a second, common plane spaced from and parallel to said first plane.

14. The foldable frame of claim 13 and further comprising means rigidly connecting said front and rear right side linkage to one another for conjoint movement about said first and second axes, and means rigidly connecting said front and rear left side linkages to one another for conjoint movement about said third and fourth axes.

15. The foldable frame of claim 9 wherein said movable axes are on one side of a straight line extending between said fixed axes when said frame is in said folded position and on the other side of said line when said frame is in said erected position.

16. The foldable frame of claim 9 and further including wheel-mounted transport means upon which said frame is carried.

17. The foldable frame of claim 9 and further including wall means supported by said frame to form an enclosure of relatively smaller and larger volumes when said frame is in said folded and erected positions, respectively.

18. The foldable frame of claim 9 and further including means engageable between said central linkages and each of said right and left side linkages for releasably fixing the relative positions of said linkages.

19. The foldable frame of claim 18 wherein said engageable means comprises threaded, frictional engagement means.

* * * * *